(12) United States Patent
Cases et al.

(10) Patent No.: US 7,987,110 B2
(45) Date of Patent: Jul. 26, 2011

(54) MANAGING ORGANIZATIONAL RESOURCES

(75) Inventors: Moises Cases, Austin, TX (US); Candice Leontine Coletrane, Durham, NC (US); Bhyrav Murthy Mutnury, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1032 days.

(21) Appl. No.: 11/828,111

(22) Filed: Jul. 25, 2007

(65) Prior Publication Data

US 2009/0030927 A1   Jan. 29, 2009

(51) Int. Cl.
*G06Q 10/00* (2006.01)

(52) U.S. Cl. ............... 705/7.13; 705/319; 705/7.25

(58) Field of Classification Search .......... 705/8, 9, 705/7.12, 319
See application file for complete search history.

(56) References Cited

U.S. PATENT DOCUMENTS

| | | | |
|---|---|---|---|
| 6,578,005 B1* | 6/2003 | Lesaint et al. ............ 705/8 |
| 6,842,748 B1 | 1/2005 | Warner et al. |
| 2002/0063686 A1* | 5/2002 | Schaum ............ 345/156 |
| 2002/0069079 A1* | 6/2002 | Vega ............ 705/1 |
| 2003/0177049 A1 | 9/2003 | Honda et al. |
| 2004/0088322 A1* | 5/2004 | Elder et al. ............ 707/103 Y |
| 2005/0050158 A1 | 3/2005 | Solari |
| 2005/0075917 A1 | 4/2005 | Flores et al. |
| 2005/0177385 A1 | 8/2005 | Hull et al. |
| 2006/0026033 A1 | 2/2006 | Brydon et al. |
| 2006/0026057 A1 | 2/2006 | Ikeda et al. |
| 2006/0190281 A1* | 8/2006 | Kott et al. ............ 705/1 |
| 2006/0190536 A1 | 8/2006 | Strong et al. |
| 2007/0192299 A1* | 8/2007 | Zuckerberg et al. ........ 707/3 |

OTHER PUBLICATIONS

IBM, "Social Net Data Mining for Business Environments", Jul. 2006, pp. 1-3, www.ip.com.
Johnson et al., "Communication Roles, Perceived Effectiveness, and Satisfaction in an Environmental Management Program", Computational & Mathematical Organization Theory, vol. 14, No. 3, 1998, pp. 223-239. .
Changhuo et al., "Social network Analysis", Journal of the China Society for Scientific and Technical Information, vol. 22, No. 3, pp. 365-374.
Wang et al., "Automated Tool for Managing Interactions in Virtual Communities Using Social Network Analysis Approach", Journal of Organizational Computing and Electronic Commerce, vol. 14, No. 1, 2004 pp. 1-26.

* cited by examiner

*Primary Examiner* — Beth V Boswell
*Assistant Examiner* — Adrian J McPhillip
(74) *Attorney, Agent, or Firm* — Yee & Associates, P.C.; David A. Mims, Jr.

(57) ABSTRACT

A computer implemented method, apparatus, and computer program product for managing organizational resources. The process combines social group data with management information data to form social network data, wherein social group data is derived from interactions among a plurality of users of a social group. The process analyzes the social network data to identify associations among the plurality of users, and generates a multidimensional social network model using the associations among the plurality of users. Thereafter, the process presents a set of recommendations for allocation of the organizational resources, wherein the set of recommendations are derived from the social network model.

11 Claims, 4 Drawing Sheets

MANAGING ORGANIZATIONAL RESOURCES

BACKGROUND OF THE INVENTION

1. Field of the Invention

The present invention relates generally to an improved data processing system, and in particular to a computer implemented method and apparatus for managing organizational resources. Still more particularly, the present invention relates to a computer implemented method, apparatus, and computer usable program product for generating a social network model for optimizing use of organizational resources.

2. Description of the Related Art

A social group is a formal or informal collection of people who interact with one another, often share a common identity, and accept roles, expectations, and obligations as members of the group. A formal social group is a group whose members interact, in part, according to predefined rules and within established hierarchies. For example, a formal social group may be members of a department within a corporate organization, a government, or a professional sports team. An informal social group, on the other hand, is a group whose members often interact without regard to formal rules. For example, an informal social group may be a family, classmates, or friends. An informal social group may also develop within a formal social group. For example, co-workers of a department may also interact with one another about matters unrelated to their work. Thus, co-workers who regularly have lunch with one another or who participate in a monthly book club form informal social groups.

A social group may be modeled by a social network model. Existing social network models are models that describe personal or professional relationships between individuals. Social networks represent both a collection of ties between people and the strength of those ties. Social network models assist in determining how information moves throughout groups. In other words, social network models describe the interpersonal relationships among members of a social group. Often, a social network model is depicted as a collection of nodes, each representing a member of the social group. Further, each node is connected to one or more other nodes by lines.

Because the information presented in existing social network models is limited to only the ties between members of a social group, existing social network models have limited utility for managing and allocating organizational resources. Organizational resources are the resources of a formal or informal social group. Organizational resources include, for example, human resources, financial resources, and all tangible or intangible resources that may be possessed by an organization or the members of the organization.

As such, currently used methods for managing and allocating organizational resources either have been limited to assignment of resources by departmental managers without regard to social groups and the attributes and characteristics of its members. Thus, resource allocation, such as the assignment of people to complete tasks, is inefficient and thus costly.

SUMMARY OF THE INVENTION

The illustrative embodiments described herein provide a computer implemented method, apparatus, and computer usable program product for managing organizational resources. The process combines social group data with management information data to form social network data, wherein social group data is derived from interactions among a plurality of users of a social group. The process analyzes the social network data to identify associations among the plurality of users, and generates a multidimensional social network model using the associations among the plurality of users. Thereafter, the process presents a set of recommendations for allocation of the organizational resources, wherein the set of recommendations are derived from the social network model.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
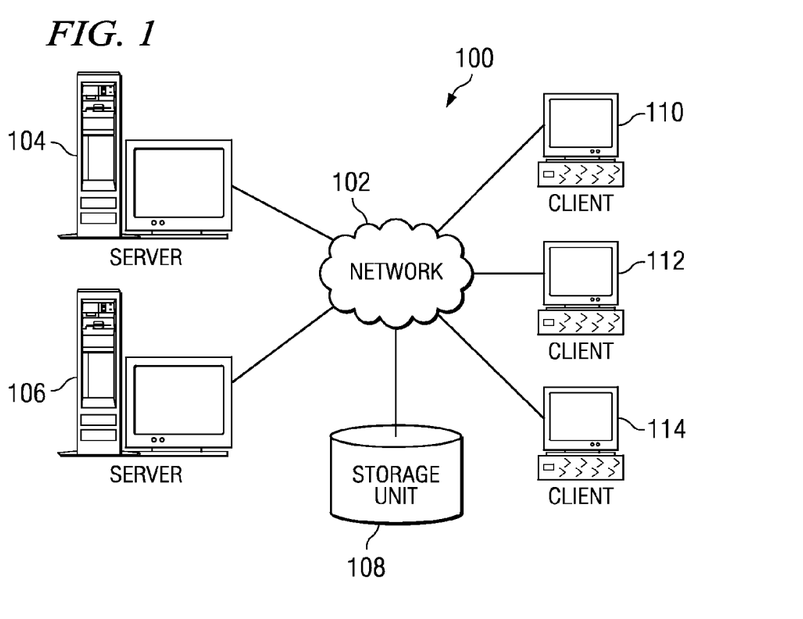
FIG. 1 is a pictorial representation of a network data processing system in which illustrative embodiments may be implemented.
Figure 2:
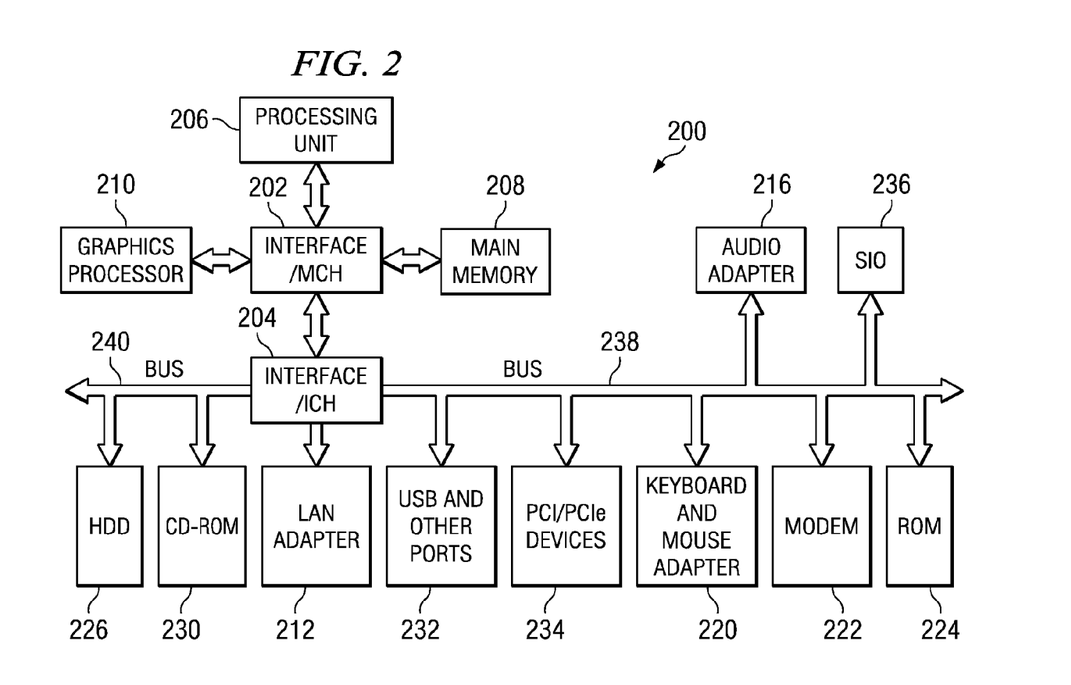
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments described herein provide a computer implemented method, apparatus, and computer usable program product for managing organizational resources. The process combines social group data with management information data to form social network data, wherein social group data is derived from interactions among a plurality of users of a social group. The process analyzes the social network data to identify associations among the plurality of users, and generates a multidimensional social network model using the associations among the plurality of users. Thereafter, the process presents a set of recommendations for allocation of the organizational resources, wherein the set of recommendations are derived from the social network model.

Using the social network model, the process may assign one or more members of an organization to a group for completing a project or task in the most efficient manner. The process selects the group members according to one or more attributes, such as skills, strength of relationship with other group members, history of tasks performed in the past, or any other attribute. The members of the selected group possess qualities that complement one another to insure a successful and efficient completion of the project or task.

The process may also use the social network model to generate recommendations for mitigating effects of a pandemic event. A pandemic event is an event that may destroy or otherwise render ineffective a part of an organization at a particular location. For example, a pandemic event may be a flood, earthquake, power outage, budget cuts that dissolve a branch office, or any other localized event or catastrophe affecting an organization's ability to function at a particular location.

Figure 3:
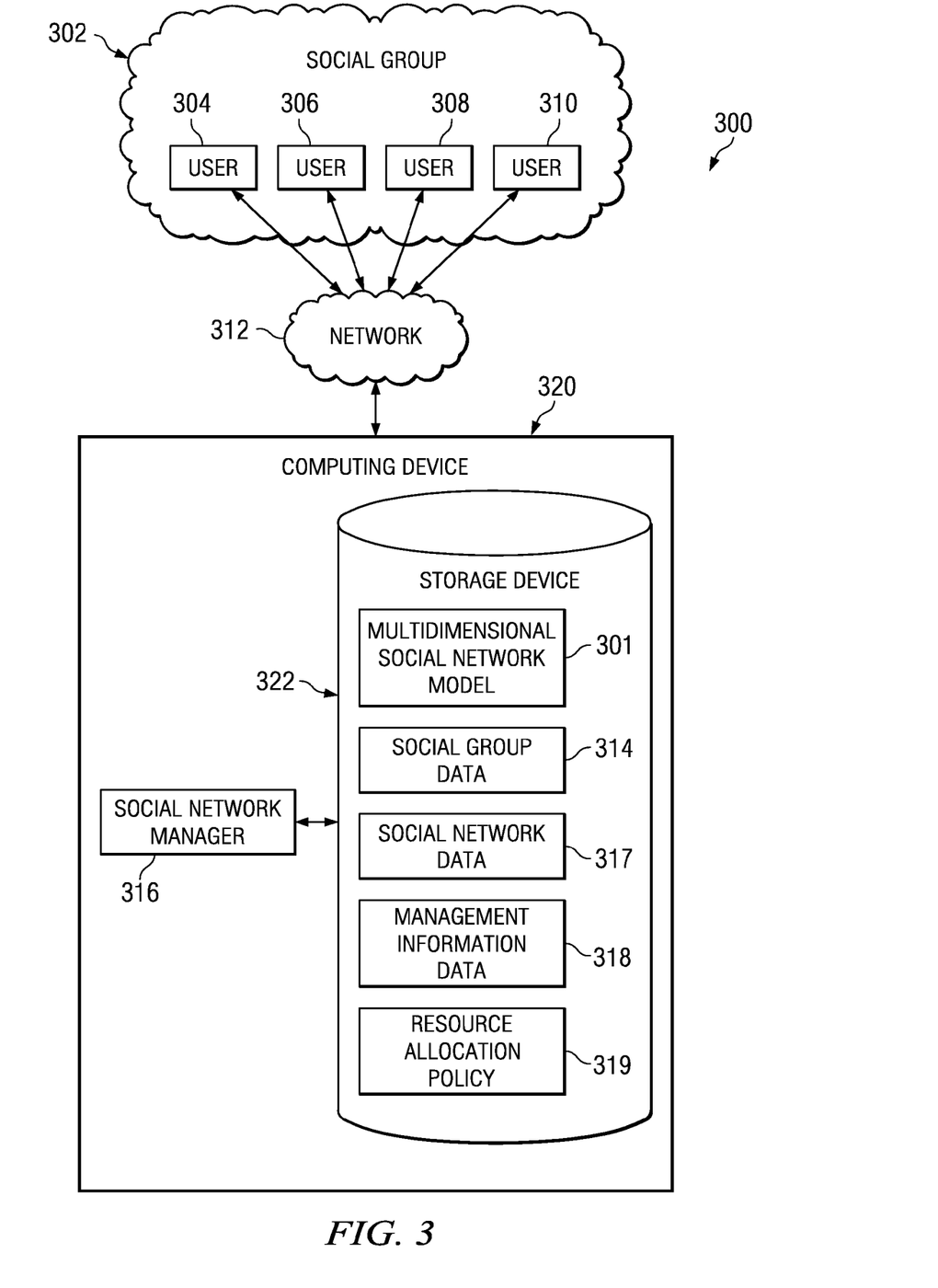
FIG. 3 is a diagram of data flow through components of a computing system for use in managing organizational resources in accordance with an illustrative embodiment.

Turning now to FIG. 3, a diagram of data flow through components of a system for managing organizational resources is depicted in accordance with an illustrative embodiment. System 300 is a system, such as network data processing system 100 in FIG. 1. System 300 is operable to generate multidimensional social network model 301, which is usable to manage and allocate organizational resources. Multidimensional social network model 301 is a social network model that depicts the interpersonal relationships between members of a social group, but which also incorporates other social group attributes such as skills, tasks, and locations. Multidimensional social network model 301 may include weighting factors.

Multidimensional social network model 301 is generated, in part, based upon the interaction between members of social group 302. In this example, social group 302 is a formal association of people, such as, for example, a corporate social group. A corporate social group is a social group that develops and evolves in a business setting. The corporate social group may be partially affected by formal assignments, rules, and established hierarchies. In addition, the corporate social group also depicts the informal relationships developed in a corporate social group, such as relationships developed through chance encounters in a company cafeteria, at the water cooler, or in the hallway.

In other embodiments, social group 302 may also be an informal association of people. For example, social group 302 may be a collection of users participating in the online social networking sites such as Myspace®, Facebook®, or Friendster®. Myspace is a registered trademark of MySpace, Inc. Facebook is a registered trademark of Facebook, Inc. Friendster is a registered trademark of Ziff Davis Publishing Holdings, Inc.

The members of social group 302 are users 304, 306, 308, and 310. As used herein, a member of a social group may also be used interchangeably with a user. In this illustrative example, users 304, 306, 308, and 310 interact with one another through network 312. Network 312 is a network, such as network 102 in FIG. 1. For example, where network 312 is a network of computer systems, users 304, 306, 308, and 310 may operate the computer systems to interact with one another. In this example, users 304, 306, 308, and 310 may use the network of computer systems to send and receive emails and instant messages, post messages on Internet forums, or talk via webcam. In other embodiments, where network 312 includes a network of audio communication devices, users 304, 306, 308, and 310 may also interact and communicate with one another by utilizing telephones, cell phones, walkie talkies, or other similar communications devices.

In other embodiments, network 312 may include sensors (not shown) for detecting interaction between members of social group 302. For example, the sensors may include digital video cameras, identification badges and readers, or biometric sensors operable to record the interaction between members of social group 302. Thus, a video camera of network 312 located in a cafeteria may capture video data showing members of social group 302 having lunch. Such information may then be used to determine the manner, frequency, and extent to which members of social group 302 interact on an informal basis.

The relationships between the members of social group 302 may be used to form the basis of a multidimensional social network model 301. These relationships between users 304, 306, 308, and 310 may be identified by retrieving and analyzing social group data 314. Social group data 314 is data derived from the interaction of the members of social group 302. For example, social group data 314 may describe who interacts with whom, how much, the type, content, and amount of interaction between the members of social group 302. These interactions may include, without limitation, conversations between members of a social group, projects or tasks on which members have concurrently worked, events that members have attended together, work reviews submitted to a supervisor on behalf of another social group member, or even the avoidance of contact altogether. In this example, social group data 314 is collected by social network manager 316.

Social network manager 316 is a software application operable to retrieve and analyze social group data 314. Social group data 314 may be retrieved as it passes through network 312. For example, social network manager 316 may monitor network 312 for communication between members of social group 302 and gather information relating to the communication. The communication may include, without limitation, email messages, instant messages, telephone conversations, and webcam chat sessions. Information relating to the communication may include the participants of the communication, the subject matter and duration of the communication, and the frequency with which those participants communicate. Thus, by monitoring the communication between the members of social group 302, social network manager 316 may identify relationships between users 304, 306, 308, and 310.

To generate the multidimensional social network model, social network manager 316 also retrieves and analyzes management information data 318. Management information data 318 is data relating to an organization's resources. In particular, management information data 318 includes data that identifies an organization's resources and governs the use of those resources. Management information data 318 may include, for example, lists of people or employees and the skills they possess, the location to which the employees are assigned, the tasks to which those people have been assigned or are currently assigned, technologies possessed by the organization, and organizational procedures, policies, and goals. Social network manager 316 may retrieve management information data 318 from organizational charts, corporate bylaws, corporate policies, organizational goals, lists of organizational resources, corporate directories, personnel files, past projects, corporate archives or databases, or any other source of information relating to an organization.

Social network manager 316 combines social group data 314 with management information data 318 to form social network data 317. Social network data 317 is data that has been processed or filtered for further analysis. For example, social network manager 316 may not be capable of analyzing raw or unprocessed video images captured by a video camera or a webcam. The video images may need to be processed into data and/or metadata describing the contents of the video images before social network manager 316 may be able to organize, structure, or otherwise manipulate the data and/or metadata. The video images converted to data and/or metadata that are ready for processing or analysis to create multidimensional social network model 301 is an example of social network data.

Social network manager 316 analyzes social network data 317 to identify associations among the plurality of users. Associations among the plurality of users are relationships between members of a social group, as well as the relationship of each user with predefined organizational attributes.

Organizational attributes may include, for example, skills possessed by each member of social group, locations at which the members may be located, and the various tasks associated with each member.

Further, social network manager 316 may assign weights to the various associations. The weights are values usable to determine a degree of association. Thus, a weighted association between two people can be used to determine whether the people are friends or merely acquaintances. Likewise, a weighted association between a person and a skill can be used to determine whether that person is an expert or a novice regarding that skill.

The weights may be determined according to one or more criteria specified within resource allocation policy 319. Resource allocation policy 319 is a set of criteria or rules governing the collection and analysis of data and information within system 300. Thus, for example, resource allocation policy 319 may include a rule specifying that users having an advanced degree in a particular field of study are deemed experts with respect to any related skills. On the other hand, resource allocation policy 319 may include another rule providing that users who lack formal training regarding a field of study are deemed novices with respect to any related skills.

After analyzing the social network data, social network manager 316 generates multidimensional social network model 301 from the associations among the plurality of users. Social network manager 316 may then use multidimensional social network model 301 to generate a set of recommendations for managing organizational resources. The set of recommendations is one or more recommendations or proposals instructing a user of an organization of the optimal allocation or use of organizational resources. Thus, the set of recommendations may define a group of users for working on a project, or may suggest a placement of certain resources to mitigate the occurrence of pandemic events.

Social network manager 316 may generate the recommendations for the allocation and use of organizational resources according to resource allocation policy 319. For instance, resource allocation policy 319 may include rules for governing the manner and extent to which the weighted associations are to be considered in allocating and using organizational resources. For example, resource allocation policy 319 may contain a set of rules for selecting members of an organization to a group for performing a task. The rules may dictate that the most important criteria for selecting group members is a level of expertise. Thus, a member that has an expert rating may be selected first. A member having a novice rating in another necessary skill, however, may be omitted from the group in favor of another member having a strong relationship with other selected members. Thus, a group dynamic may be specially tailored according to one or more rules set forth in resource allocation policy 319.

In this illustrative example in FIG. 3, social network manager 316 is executing in computing device 320. Commuting device 320 is a computing device such as client 110 and server 106 in FIG. 1. Computing device 320 also includes storage device 322. Storage device 322 is a device for storing data, information, and other computer readable media usable by computing device 320. Storage device 322 may be a storage device, such as storage 108 in FIG. 1, and HDD 226 in FIG. 2. Computing device 320 is coupled to network 312. As such, social network manager 316 may monitor network 312 for social group data 314. Once discovered, social network manager 316 stores social group data 314 in storage device 322.

Social group data 314 and management information data 318 may be stored in databases in storage device 322. The databases may be any form of structured collection of records or data, such as, for example, a spreadsheet, a table, a relational database, a hierarchical database, or the like. The databases may be stored in storage device 322 or in the operating memory of the data processing system, externally on a secondary data storage device, locally on a recordable medium such as a hard drive, floppy drive, CD ROM, DVD device, remotely on a storage area network, such as storage area network 108 in FIG. 1, or in any other type of storage device.

Figure 4:
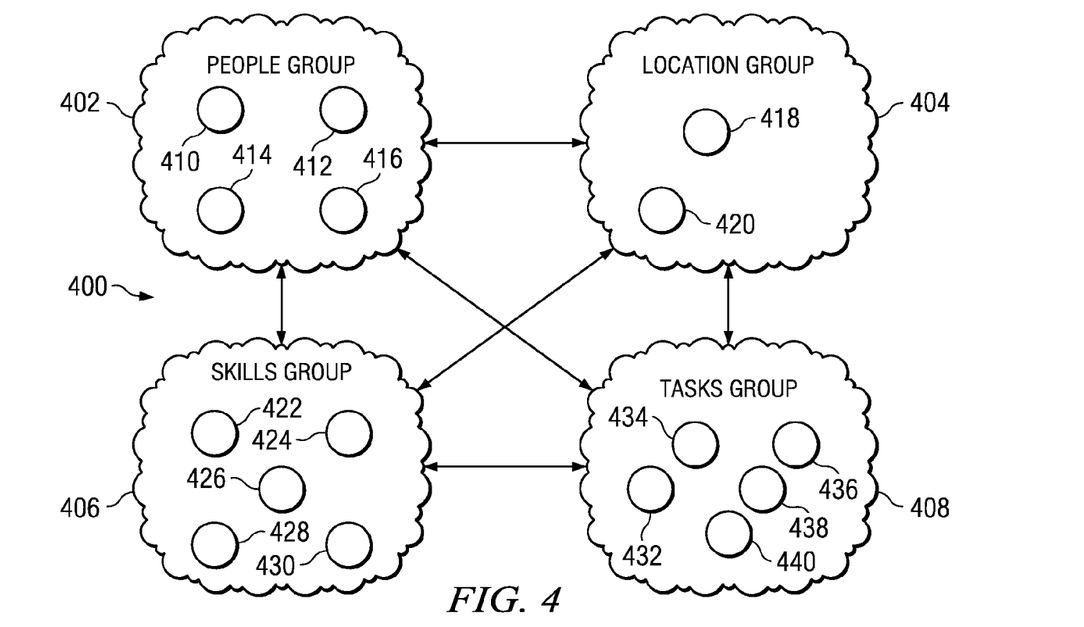
FIG. 4 is a diagram of a social network model in accordance with an illustrative embodiment.

Turning now to FIG. 4, a simplified diagram of a multidimensional social network model is depicted in accordance with an illustrative embodiment. Multidimensional social network model 400 is a multidimensional social network model such as multidimensional social network model 301 in FIG. 3. Multidimensional social network model 400 is presented to illustrate the various social network model dimensions which may be created and analyzed to optimize the management and allocation of organizational resources. The analysis of the social network model dimensions may be performed by a social network manager, such as social network manager 316 in FIG. 3.

In this illustrative example, multidimensional social network model 400 includes four interconnected attribute groups. In alternate embodiments, however, more or fewer attribute groups may be represented. The attribute groups of multidimensional social network model 400 depicted in FIG. 4 include people group 402, location group 404, skills group 406, and tasks group 408.

Each attribute group includes one or more nodes that represent a unique element of that attribute group. For example, people group 402 includes users 410, 412, 414, and 416. Users 410, 412, 414, and 416 represent members of a social group, such as social group 302 in FIG. 3. As such, users 410, 412, 414, and 416 may correspond to the users of social group 302.

Similarly, location group 404 includes locations 418 and 420 that represent unique locations. For example, locations 418 and 420 of location group 404 may represent different floors of an office building, different buildings located in the same city or different cities, different cities, different states, or different countries.

Skills group 406 includes skills 422, 424, 426, 428, and 430. Each skill node represents a unique skill. A skill may be, for example, a proficiency with a foreign language, knowledge of a particular programming language, an undergraduate degree in a particular field of study, familiarity with a particular computer system, or any other skill.

Tasks group 408 includes tasks 432, 434, 436, 438, and 440. Each node within tasks group 408 represents task, objective, or goal of the organization from which people group 402 is derived. Each node may represent, for example, an individual project or the various tasks that form a project. Thus, where multidimensional social network model 400 is derived from a social group within a construction company, each node within tasks group 408 may represent one task that must be completed in order to complete a construction project. For example, the nodes of tasks group 408 may represent unique tasks such as drafting blueprints, scouting building locations, equipment procurement, site preparation, construction, inspection, and sale of the final product.

In FIG. 4, each attribute group is connected to another attribute to illustrate an association or relationship between the various attribute groups. Thus, people group 402 is connected to location group 404 to illustrate that the members of people group 402 may be associated to a location represented by a node within location group 404. Similarly, people group 402 is connected to skills group 406 to illustrate that members of people group 402 may possess one or more skills of skills group 406. Likewise, people group 402 is connected to tasks group 408 to depict that members of people group 402 are assigned to one or more tasks defined in tasks group 408.

In addition, location group 404 is connected to skills group 406 to show that skills depicted in skills group 406 are associated with locations within location group 404. For example, because skills represented by skills 422, 424, 426, 428, and 430 cannot exist independently from members of people group 402, the association of skills from skills group 406 to location group 404 can be determined by the association of a member of people group 402 and a location of location group 404. Thus, if user 416 possesses skill 424, and if user 416 is associated with location 420, then skill 424 is also associated with location 420.

Location group 404 is connected to tasks group 408 to show that tasks may be associated with locations. For example, returning to the construction example referenced above, if location 418 is the construction company's headquarters and location 420 is the construction site, and task 432 is laying concrete for creating a building foundation, then task 432 is necessarily associated with location 420 rather than location 418. However, in other examples, one or more tasks may be associated with one or more locations.

Tasks group 408 is connected to skills group 406 to show that one or more tasks are associated with one or more skills. For example, if task 432 is laying a foundation, and skill 424 indicates prior experience laying foundation, then skill 424 is associated with tasks 432.

Each node of people group 402 may be connected to one or more nodes within people group 402. Further, each node of people group 402 may be connected to one or more nodes of the other attribute groups of multidimensional social network model 400. Thus, user 416 may be connected to users 410 and 412. In addition, user 416 may be connected to one or more nodes of location group 404, one or more nodes of skills group 406, and one or more nodes of tasks group 408. However, in this illustrative example in FIG. 4, multidimensional social network model 400 is a simplified multidimensional social network model showing only the general manner in which the attribute groups may be associated.

One or more attribute groups may form a unique network of multidimensional social network model 400. For example, the relationships between users 410, 412, 414, and 416 form a people-people network dimension. Similarly, relationships between people group 402 and skills group 406 form a people-skills network dimension, and relationships between people group 402 and location group 404 form a people-location network dimension. Likewise, relationships between people group 402, skills group 406, and tasks group 408 form a people-skills-task network dimension. In addition, relationships between people group 402, skills group 406, and location group 404 form a people-skills-location network dimension. Analysis of each of these various networks of multidimensional social network model 400 provides information about the existence and use of organizational resources. A more detailed discussion about the analysis of these social network dimensions is presented in FIG. 5.

Figure 5:
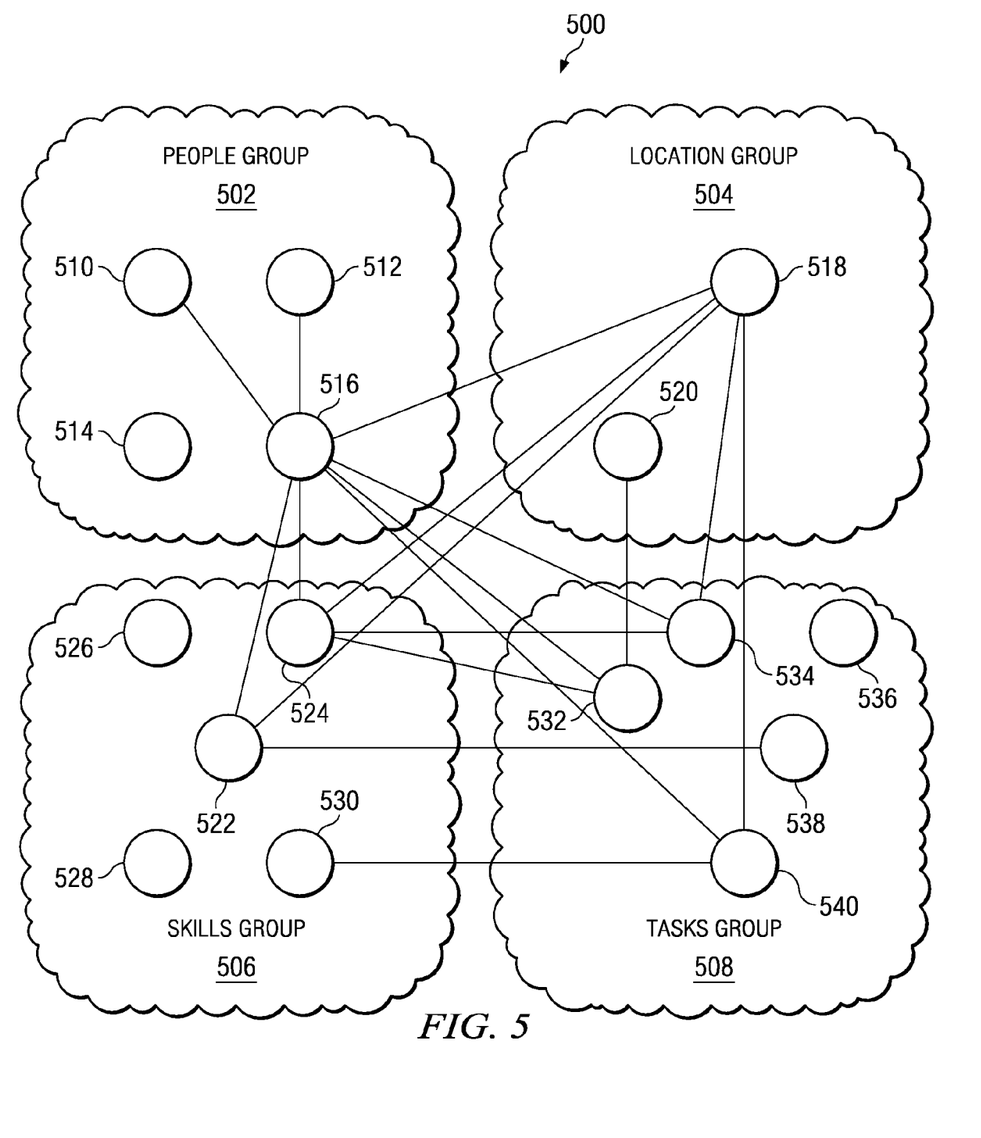
FIG. 5 is a flowchart of a process for managing organizational resources in accordance with an illustrative embodiment.

Turning now to FIG. 5, a multidimensional social network model is depicted in accordance with an illustrative embodiment. Multidimensional social network model 500 is a multidimensional social network model, such as multidimensional social network model 400 in FIG. 4. In this example, multidimensional social network model 500 is a multidimensional social network model derived from a currently existing corporate social group.

In this example, multidimensional social network model 500 includes people group 502, location group 504, skills group 506, and tasks group 508. People group 502 is an attribute group such as people group 402 in FIG. 4. Similarly, location group 504, skills group 506, and tasks group 508 are also attribute groups, such as location group 404, skills group 406, and tasks group 408 in FIG. 4, respectively. As with the attribute groups in FIG. 4, each attribute group in FIG. 5 includes one or more nodes that represent unique elements of that particular attribute group. Thus, people group 502 includes users 510, 512, 514, and 516 each of whom represents a unique member of a social group. Location group 504 includes locations 518 and 520 that represent unique locations at which a member of people group 502 may be found. Skills group 506 includes skills 522, 524, 526, 528, and 530 that represent unique skills possessed by one or more members of people group 502. Tasks group 508 includes tasks 532, 534, 536, 538, and 540 that represent unique tasks assigned to or otherwise associated with members of people group 502.

For ease of reference, only the relationship of user 516 is depicted in multidimensional social network model 500 in FIG. 5. However, similar associations for users 510, 512, and 514 may be generated. Each member of people group 502 is connected to all other members with whom that member has had some interaction. Thus, in FIG. 5, user 516 is connected to users 510 and 512 because user 516 has had some form of interaction with users 510 and 512. The interaction may have consisted of an exchange of emails, telephone calls, instant messages, or even casual conversations in the hallway.

Each member of people group 502 is also connected to one or more locations of location group 504. Generally, users are connected to a location node representing the location to which the user is assigned or otherwise associated. For example, in this example, user 516 is connected to location node 518 because user 516 works at a corporate office located at location 518. In most instances, a single user is associated with a single location. In some instances, a single user may be connected to more than one location node, as in the instance where a user is assigned to a different office in two different locations. For example, a traveling consultant may have a first office at a corporate headquarters and a second office at a client site. In this situation, the consultant may be connected to two locations in location group 504. Further, more than one user may be linked to the same location node.

Additionally, each member of people group 502 is connected to one or more skills nodes of skills group 506. As discussed above, the various nodes of skills group represent the skills possessed by members of people group 502. In this example, user 516 is connected to skills 522 and 524 because user 516 possesses the skills represented by skills 522 and 524. Similarly, because user 516 is associated with location 518, then location 518 is also connected to skills 522 and 524.

Members of people group 502 are also connected to one or more task nodes within tasks group 508. This connection depicts the various tasks that have been assigned to or are otherwise associated with a user of a social group. Thus, in this example, user 516 is connected to tasks 532, 534, and 540 to illustrate that user 516 has been assigned to work on or is otherwise associated with three distinct tasks.

As discussed with respect to the association of task group 408 and skills group 406 in FIG. 4, the connection of nodes within tasks group 508 and nodes within skills group 506 illustrates the various skills necessary for successfully working on or completing a task. Thus, in FIG. 5, task 534 is connected to skill 524 to show that skill 524 is necessary for effectively completing task 534. Similarly, because skill 524 is the same skill necessary for task 532, skill 524 is also connected to task 532. For the same reason, task 538 is connected to skill 522, and task 540 is connected to skill 530.

Likewise, as discussed with respect to the association of location group 404 to tasks group 408 in FIG. 4, one or more nodes from location group 504 are connected to one or more nodes from task group 508 to illustrate the various locations from which tasks are performed. In FIG. 5, location 518 is connected to tasks 534 and 540 to show that tasks 534 and 540 are performed at location 518. Further, location 520 is connected to task 532 to show that task 532 is performed at location 520.

The connections between the nodes of the various attribute groups of multidimensional social network model 500 may be analyzed from one or more network dimensions to optimize the use of organizational resources for completing organizational tasks. Multidimensional social network model 500, when analyzed by a social network manager, such as social network manager 316 in FIG. 3, may highlight or identify inefficiencies in how organizational resources are currently being used, or may assist in the allocation of organizational resources to optimize the use of those resources not yet utilized. As discussed above, multidimensional social network model 500 is a social network model depicting the current use of organizational resources.

Analysis of the people-people network supplies information relating to the formal and informal relationships between members of a social group. In particular, the people-people social network provides insight about how information flows throughout an organization, how well the members know one another, which members get along, and other similar types of information. This information may then be used for managing an organization's human resources. For example, information derived from the analysis of the people-people network enables an organization to assign members of a social group to a particular task. Thus, if users 510 and 512 are already assigned to a particular project requiring three members, a project director may reference the people-people network to select user 516 to assist users 510 and 512. User 516 is preferred over user 514 because user 516 has preexisting relationships with users 510 and 512. The preexisting relationship may indicate, for example, that users 510, 512, and 516 get along with one another, often seek each other for guidance on work-related or personal matters, or have worked on previous projects in the past.

Further, the information provided in the people-people social network may enable an organization to take remedial steps to insure that all the members of people group 502 have sufficient relationships with the other members. Thus, if user 514 had a relationship with only one other member of people group 502, then the organization would know to initiate appropriate team-building exercises to foster friendships and boost organizational morale. Good relationships foster communication. Communication fosters the exchange of ideas that leads to innovation. However, communication of members of a social network having complementary skills further promotes innovation and problem solving.

Analysis of the people-skill network may provide an organization with information regarding hiring of prospective employees. For example, if the people-skill network dimension shows that one or more skills are absent from a social group, or the skills are inadequately represented among the existing members of the social group, then an organization may hire employees having the desired set of skills. In addition, the people-skill network may be used to select the group of organizational members best suited for working on a project or task. For example, if a project involves the creation of a software program, at least one member of the group should possess the requisite programming knowledge to write the software program.

Analysis of the people-skill-location network dimension provides an organization with information regarding the concentration of human resources at a particular location. Such information may be used for purposes of pandemic planning, for making hiring decisions, or for assigning projects or tasks. For instance, contingency plans may be developed and organizational resources may be redistributed in response to simulating the occurrence of a pandemic event that destroys an organization's resources in a particular location. Thus, an environmental catastrophe, such as a flood or hurricane in a part of the country will not cripple an entire organization's ability to function because resources are properly distributed. For example, if user 512 possesses the same skills as user 516, then an organization may choose to assign user 512 to location 520. Consequently, an event that reduces or eliminates operational functionality of location 518 would not prevent an organization from having access to skills 522 and 524.

In this simulation, a organizational director may simulate the elimination of a particular location. The location may be eliminated because of a natural disaster, forcing the location to shut down. Additionally, the location may be shut down because of budget cuts. In any event, removal of a node from location node 404 represents the elimination of a particular location. A social network manager, such as social network manager 316 in FIG. 3, may then modify social network model 400 to accommodate the elimination of a location node and determine the effect on the social network. The social network manager may also provide a set of recommendations as to the reallocation of resources to reestablish lines of communication and access to organizational resources.

In addition, analysis of a people-skill-location network enables an organization to determine which location to place newly hired employees having specified skills. For example, if location 518 is already associated with a large number of employees having skill 524, then an organization may assign a newly hired employee having skill 524 to location 520. Similarly, an organization may also use the people-skill-location network dimension to assign projects to certain locations. For example, tasks may be assigned to employees of those locations having the requisite number of employees or employees having the necessary set of skills to complete the project.

The analysis of a people-skills-task network provides an organization insight about whether work is assigned to an organizational member best suited for the task. For example, user 516 is assigned to work on tasks 532, 534, and 540. As is evident from multidimensional social network model 500, user 516 possesses skill 522 and 524. Skill 524 is a skill necessary for working on tasks 532 and 534. An analysis of the people-skills-task network shows that user 516 is a preferred member of people group 502 for working on tasks 532 and 534. However, user 516 is also assigned to work on task 540. Completion of task 540 requires skill 530 that user 516 does not possess. Thus, in order to complete task 540, user 516 is required to spend significant amounts of time to acquire skill 530, or may have to seek assistance from another member of people group 502 in order to complete task 540. Thus, the analysis of the people-skill-task network shows that the assignment of task 540 to user 516 is not the optimal use of the organization's resources.

Further, analysis of the people-skills-tasks network shows that user 516 should be reassigned from task 540 to task 538. This reassignment is preferential because user 516 possesses skill 522, which is necessary for completing task 538. In this manner, an organization can optimize its use of organizational resources to ensure that the proper personnel are assigned to work on tasks to which they have the skills to complete.

An analysis of a people-task-location network provides information to enable an organization to assign members of people group 502 to certain organizational tasks. For example, user 516 is assigned to work on tasks 532, 534, and 540. Because user 516 is stationed at location 518, the assignment of tasks 534 and 540 to user 516 is preferred because the tasks are also at location 518. However, task 532 is located at location 520. Because user 516 is not found in the same location as task 532, user 516 may be required to perform unnecessary and time consuming travel, may spend time telecommuting, or rely heavily upon another person at location 520. In any event, user 516 is not the best person for performing task 532 because user 516 is located remotely to task 532.

The connectors, or "ties", between the various nodes of multidimensional social network model 500 are depicted as uniform lines. However, in another embodiment, the ties may be depicted differently to depict strengths of relationships. For example, users that have strong relationships, as defined by frequent communication or contact, may be connected by boldly drawn ties. The users having weak relationships may be depicted as connected with a fine line, or with a dotted line.

Similarly, the ties between nodes of people group 402 and skills group 406 in FIG. 4 may also be drawn to represent varying degrees of expertise with respect to a particular skill. For example, users having an advanced degree in a particular field or skill may be deemed experts, and thus connected to that skill with a boldly drawn line. Users having limited experience or exposure to a particular skill may be considered novices and thus, connected to the skill with a fine or dotted line. In this manner, the varying degrees of expertise may be represented differently by different types of lines or connectors.

Figure 6:
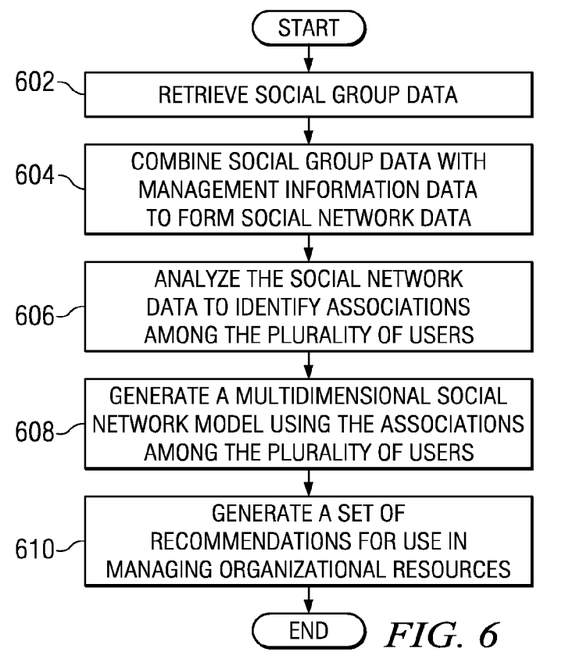
FIG. 6 is a flowchart of a process for managing organizational resources in accordance with an illustrative embodiment.

Turning now to FIG. 6, a flowchart of a process for managing organizational resources is depicted in accordance with an illustrative embodiment. The process may be performed by a software application such as social network manager 316 in FIG. 3.

The process begins by retrieving social group data (step 602). The social group data is data derived from an interaction between members of a social group. The social group data may include, data or metadata describing which social group members interact and the scope, frequency, and content of the interaction. The process then combines the social group data with management information data to form social network data (step 604).

The process analyzes the social network data to identify associations among the plurality of users (step 606). Thereafter, the process generates a multidimensional social network model using the associations among the plurality of users (step 608). Once created, the process uses the multidimensional social network model to generate a set of recommendations for use in management of organizational resources (step 610), and the process terminates thereafter. The set of recommendations may define a group of social group members for working on a task or may assist an organization in developing contingency plans for addressing pandemic events.

Figure 7:
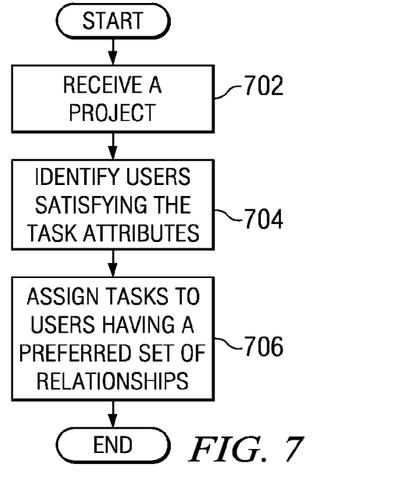
FIG. 7 is a flowchart of a process for defining a group of users for collaborative work on a task in accordance with an illustrative embodiment.

Turning now to FIG. 7, a flowchart of a process for defining a group of users for collaborative work on a task in accordance with an illustrative embodiment. The process may be performed by a software application such as social network manager 316 in FIG. 3.

The process begins by receiving a project (step 702). The project may include one or more tasks that must be accomplished to complete the task. Each task may include one or more attributes that may help identify a suitable user for completing a particular task. The process identifies users satisfying the task attributes (step 704). The task requirements may be, for example, a predefined set of skills, a location at which the user is located, or a strength of an interpersonal relationship with other users working on the same project.

The process then assigns tasks to the users having a preferred set of relationships step 706), and the process terminates thereafter.

The flowcharts and block diagrams in the different depicted embodiments illustrate the architecture, functionality, and operation of some possible implementations of methods, apparatus, and computer usable program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments described herein provide a computer implemented method, apparatus, and computer usable program product for managing organizational resources. The process combines social group data with management information data to form social network data, wherein social group data is derived from interactions among a plurality of users of a social group. The process analyzes the social network data to identify associations among the plurality of users, and generates a multidimensional social network model using the associations among the plurality of users. Thereafter, the process presents a set of recommendations for allocation of the organizational resources, wherein the set of recommendations are derived from the social network model.

Using the method and apparatus described herein, a manager, director, or other member of an organization may generate a multidimensional social network model for optimally allocating organizational resources. As a result, an organization will reduce its costs, improve its efficiency, and improve employee and customer satisfaction.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing organizational resources, the computer implemented method comprising:
    receiving data regarding a plurality of interactions between one or more users of a plurality of users in a social group using a plurality of sensor devices to form social group data, wherein the social group data includes information regarding a set of users involved in one or more interactions in the plurality of interactions, a frequency of one or more interactions in the plurality of interactions, a type of one or more interactions in the plurality of interactions, content from one or more interactions in the plurality of interactions, and a length of time of one or more interactions in the plurality of interactions, wherein the plurality of interactions include conversations between one or more users in the plurality of users, tasks one or more users in the plurality of users have worked together, and events one or more users in the plurality of users have attended, and wherein the plurality of sensor devices comprise video cameras, identification badges, identification readers, and biometric sensors;
    combining the social group data with management information data to form social network data;
    analyzing the social network data to identify a plurality of associations among the plurality of users, wherein analyzing the social network data further comprises identifying one or more interactions in the plurality of interactions between one or more users of the plurality of users to identify one or more associations in the plurality of associations;
    assigning, using a processing unit, a set of weightings to one or more of the plurality of associations among the plurality of users, wherein a weighting in the set of weightings assigned to an association in the one or more of the plurality of associations between users in the plurality of users is based on the information in the social group data;
    generating a multidimensional social network model using the plurality of associations among the plurality of users, wherein the multidimensional social network model includes a set of business locations of one or more users in the plurality of users, a set of skills of one or more users in the plurality of users, and a set of tasks being performed by one or more users in the plurality of users;
    presenting a set of recommendations for allocation of the organizational resources including one or more users in the plurality of users, wherein the set of recommendations are derived from the social network model and are based on the set of weightings; and
    generating a simulation of performance of the set of tasks while removing a business location in the set of business locations from the multidimensional social network model, wherein the set of recommendations include recommendations regarding allocation of the organizational resources to complete of the set of tasks without the business location.

2. The computer implemented method of claim 1, wherein the set of recommendations identifies a set of users for working on a selected task.

3. The computer implemented method of claim 1, wherein the set of associations in the multidimensional social network model further include a first number of associations between one or more users in the plurality of users and the set of business locations, a second number of associations between one or more users in the plurality of users and the set of skills, and a third number of associations between one or more users in the plurality of users and the set of tasks.

4. The computer implemented method of claim 1, wherein the management information data comprises, for one or more users in the plurality of users, a user skill, a user location, and a user task.

5. The computer implemented method of claim 1, wherein the set of social network dimensions comprises at least one of a people-people network, a people-skill network, a people-task network, a people-location network, and a people-skill-location network.

6. A computer program product comprising:
    a computer readable storage device including computer usable program code for managing organizational resources, the computer usable program code comprising:
    computer usable program code for receiving data regarding a plurality of interactions between one or more users of a plurality of users in a social group using a plurality of sensor devices to form social group data, wherein the social group data includes information regarding a set of users involved in one or more interactions in the plurality of interactions, a frequency of one or more interactions in the plurality of interactions, a type of one or more interactions in the plurality of interactions, content from one or more interactions in the plurality of interactions, and a length of time of one or more interactions in the plurality of interactions, wherein the plurality of interactions include conversations between one or more users in the plurality of users, tasks one or more users in the plurality of users have worked together, and events one or more users in the plurality of users have attended, and wherein the plurality of sensor devices comprise video cameras, identification badges, identification readers, and biometric sensors;

computer usable program code for combining the social group data with management information data to form social network data;

computer usable program code for analyzing the social network data to identify a plurality of associations among the plurality of users, wherein analyzing the social network data further comprises identifying one or more interactions in the plurality of interactions between one or more users of the plurality of users to identify one or more associations in the plurality of associations;

computer usable program code for assigning a set of weightings to one or more of the plurality of associations among the plurality of users, wherein a weighting in the set of weightings assigned to an association in the one or more of the plurality of associations between users in the plurality of users is based on the information in the social group data;

computer usable program code for generating a multidimensional social network model using the plurality of associations among the plurality of users, wherein the multidimensional social network model includes a set of business locations of one or more users in the plurality of users, a set of skills of one or more users in the plurality of users, and a set of tasks being performed by one or more users in the plurality of users;

computer usable program code for presenting a set of recommendations for allocation of the organizational resources including one or more users in the plurality of users, wherein the set of recommendations are derived from the social network model and are based on the set of weightings; and computer usable program code for generating a simulation of performance of the set of tasks while removing a business location in the set of business locations from the multidimensional social network model, wherein the set of recommendations include recommendations regarding allocation of the organizational resources to complete of the set of tasks without the business location.

7. The computer program product of claim 6, wherein the set of recommendations identifies a set of users for working on a selected task.

8. The computer program product of claim 6, wherein the set of associations in the multidimensional social network model further include a first number of associations between one or more users in the plurality of users and the set of business locations, a second number of associations between one or more users in the plurality of users and the set of skills, and a third number of associations between one or more users in the plurality of users and the set of tasks.

9. The computer program product of claim 6, wherein the management information data comprises, for one or more users in the plurality of users, a user skill, a user location, and a user task.

10. The computer program product of claim 6, wherein the set of social network dimensions comprises at least one of a people-people network, a people-skill network, a people-task network, a people-location network, and a people-skill-location network.

11. A data processing system for managing organizational resources, the data processing system comprising:
a bus system;
a storage device connected to the bus system, wherein the storage device includes program code; and
a processor unit connected to the bus system, wherein the processor unit is configured to: receive data regarding a plurality of interactions between one or more users of a plurality of users in a social group using a plurality of sensor devices to form social group data, wherein the social group data includes information regarding a set of users involved in one or more interactions in the plurality of interactions, a frequency of one or more interactions in the plurality of interactions, a type of one or more interactions in the plurality of interactions, content from one or more interactions in the plurality of interactions, and a length of time of one or more interactions in the plurality of interactions, wherein the plurality of interactions include conversations between one or more users in the plurality of users, tasks one or more users in the plurality of users have worked together, and events one or more users in the plurality of users have attended, and wherein the plurality of sensor devices comprise video cameras, identification badges, identification readers, and biometric sensors;
combine the social group data with management information data to form social network data;
analyze the social network data to identify a plurality of associations among the plurality of users, wherein analyzing the social network data further comprises identifying one or more interactions in the plurality of interactions between one or more users of the plurality of users to identify one or more associations in the plurality of associations;
assign a set of weightings to one or more of the plurality of associations among the plurality of users, wherein a weighting in the set of weightings assigned to an association in the one or more of the plurality of associations between users in the plurality of users is based on the information in the social group data;
generate a multidimensional social network model using the plurality of associations among the plurality of users, wherein the multidimensional social network model includes a set of business locations of one or more users in the plurality of users, a set of skills of one or more users in the plurality of users, and a set of tasks being performed by one or more users in the plurality of users;
present a set of recommendations for allocation of the organizational resources including one or more users in the plurality of users, wherein the set of recommendations are derived from the social network model and are based on the set of weighting;
generate a simulation of performance of the set of tasks while removing a business location in the set of business locations from the multidimensional social network model, wherein the set of recommendations include recommendations regarding allocation of the organizational resources to complete of the set of tasks without the business location.

* * * * *